(12) United States Patent
Amano

(10) Patent No.: US 7,431,983 B2
(45) Date of Patent: Oct. 7, 2008

(54) WIPING SHEET

(75) Inventor: Tatsuaki Amano, Tokyo (JP)

(73) Assignee: Rakupri Co., Ltd., Saitama-Shi (JP)

( * ) Notice: Subject to any disclaimer, the term of this patent is extended or adjusted under 35 U.S.C. 154(b) by 0 days.

(21) Appl. No.: 11/607,089

(22) Filed: Dec. 1, 2006

(65) Prior Publication Data
US 2007/0135011 A1    Jun. 14, 2007

(30) Foreign Application Priority Data
Dec. 7, 2005   (JP)  ............................ 2005-353863

(51) Int. Cl.
*B32B 27/08*    (2006.01)
*B32B 5/24*    (2006.01)

(52) U.S. Cl. .............. 428/319.3; 428/319.7; 428/316.6; 428/292.1; 428/314.4; 442/374; 442/394; 442/397

(58) Field of Classification Search ............... 428/292.1, 428/316.6, 319.3, 319.7; 442/374, 394, 397
See application file for complete search history.

(56) References Cited

U.S. PATENT DOCUMENTS 6,977,113 B2 *   12/2005   Kody et al. ............... 428/292.1

FOREIGN PATENT DOCUMENTS

| JP | 3108270 | 2/2005 |
| JP | 3663203 | 4/2005 |
| WO | WO 9749326 A1 * | 12/1997 |

* cited by examiner

*Primary Examiner*—Hai Vo
(74) *Attorney, Agent, or Firm*—Kratz, Quintos & Hanson,LLLP.

(57) ABSTRACT

OBJECT: To realize a wiping sheet with sufficient flexibility, high adhesion strength, easy attachment on concavo-convex surface, good adhesiveness and durability.

CONSTITUTION: A wiping sheet 4 wherein a microfiber cloth having a dirt wiping effect is laminated on one side of a resin film of 20 μm or less in thickness, and a polymer sheet having an adhesive effect due to suction function of fine bubbles is laminated on the other side.

4 Claims, 3 Drawing Sheets

F I G. 3
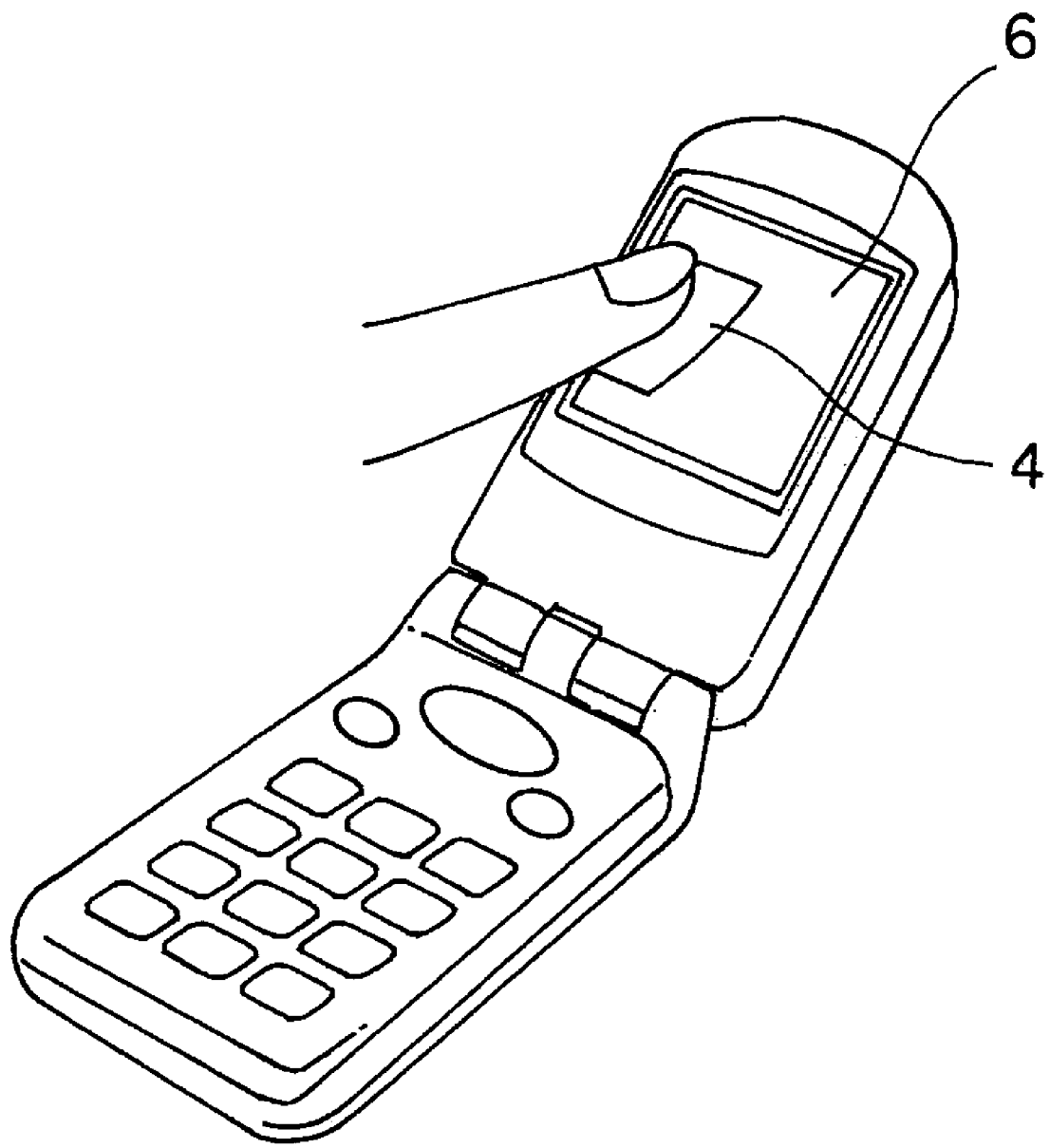

WIPING SHEET

BACKGROUND OF THE INVENTION

1. Field of the Invention

The present invention relates to a wiping sheet, which is attached on physical objects, on the spot being capable of wiping off dirt on screens of cellular phone, IT related apparatus and television, also camera lens and surface of CD.

2. Description of the Related Art

With advancing IT technologies, people have been increasingly experiencing displays of television, cellular phone, and IT related apparatus like personal computer or, optical equipment and information equipment such as digital camera and CD. These displays, camera lens and mirror surface of CD take a charge easily, so that dust tends to accumulate, there have been problems that fat of finger or palm adheres to them in the frequent use, making them dirty easily. On the other hand, there has been used a cloth of micro fibers as a wiping cloth to aim at wiping dirt off from lenses of glasses etc.

However, it is a pain to always carry such a wiping cloth together with a cellular phone, in fact, there are many instances where the very wiping cloth cannot be found being lost in other goods on the occasion of its necessity. In order to solve such problems, the present inventors have already proposed a wiping sheet that adhesive surface composed of acryl based polymer sheet being capable of adhesion many times is laminated with a microfiber cloth (see, Patent reference 1). Also, there is proposed a similar invention that a sheet-like material is provided on one side of base resin film of 20-100 μm in thickness and a removable functional layer is provided on the other side (see, Patent reference 2). In these manners, it becomes possible that by carrying a physical object on which such sheet is attached for wiping, the sheet is detached to use for wiping when needed.

However, there is a problem in Patent reference 1 that strength is insufficient and durability is poor because the polymer sheet is directly laminated with a microfiber cloth. On the other hand, there is a problem in Patent reference 2 that attachment is difficult onto a concavo-convex surface because flexibility is poor due to the base resin film.

Patent reference 1: Japanese Utility Model Patent No. 3108270

Patent reference 2: Japanese Patent No. 3663203

DISCLOSURE OF THE INVENTION

Problems to be solved by the Invention

As described above, regarding the conventional wiping sheets, there has been a problem in durability in the case where a polymer sheet is directly laminated with a microfiber cloth, and there has been a problem in poor flexibility in the case where a resin film of 20-100 μm in thickness is used as a base material.

An object of the present invention is to solve the problems by devising the thickness of based material, and realize a wiping sheet having sufficient flexibility, high adhesion strength, easy attachment onto a concavo-convex surface, good adhesiveness and durability.

SUMMARY OF THE INVENTION

To solve the above problems, the invention described in claim 1 of the present invention comprises a reusable wiping sheet which is always attached on a physical object and peeled off on the occasion of necessity, wherein a microfiber cloth having a dirt wiping effect is laminated on one side of a resin film of 20 μm or less in thickness, and a polymer sheet having an adhesive effect due to suction function of fine bubbles is laminated on the other side.

To solve the above problems, the invention described in claim 2 of the present invention is the wiping sheet described in claim 1, wherein said polymer sheet is an acryl based polymer sheet.

To solve the above problems, the invention described in claim 3 of the present invention is the wiping sheet described in claim 1 or claim 2, wherein said microfiber cloth is a non-woven cloth.

EFFECT OF THE INVENTION

The wiping sheet of the present invention is constructed as described above, thus, it can be provided at a relatively low price, exhibits effects that it is strong and durable, can be easily attached on somewhat concave-convex thanks to sufficient flexibility resulting in high adhesion strength, and can be repeatedly adhesive.

BEST MODE FOR CARRYING OUT THE INVENTION

The wiping sheet of the present invention will be explained in detail with reference to the attached drawings below. FIG. 1 is a schematic cross section of the wiping sheet in one embodiment of the present invention. In FIG. 1, symbol 1 is a microfiber cloth for wiping, symbol 2 is a polymer sheet, symbol 3 is a resin film and symbol 4 is a wiping sheet. On both surfaces of resin film 3, an adhesive agent (not shown) is applied, the microfiber cloth for wiping 1 is bonded on the one side, and the polymer sheet 2 is bonded on the other side to construct the wiping sheet 4.

This wiping sheet will be explained briefly in regard to the construction of each part.

In the microfiber cloth 1, each fiber thereof is as very fine as 0.001 to 0.5 deniers per filament for example, the cross section of fiber is also not circular, for example, is triangle, the resultant cloth certainly adsorbs dirt without putting force thereon and leaves few dirt Further, in the case of non-woven cloth, dimensional stability is good in cutting and punching out processing, there occur few fray and dust like fiber waste.

As a microfiber cloth, there is listed Savinar Minimax cloth using Belmar X as a fiber manufactured by Kanebo Gosen KK. Further, as a non-woven cloth, there are listed Baifresher and Appolon manufactured by Japan Vilene Company Ltd. and "Denkitouru" with antistatic function manufactured by the same company.

Thickness of microfiber cloth for wiping 1 is not particularly limited, in this embodiment, for example, a thickness of about 50 μm to 500 μm is used.

The polymer sheet 2 is a sheet of acryl polymer having fine bubbles on the surface. The fine bubble of the surface acts as a suction disk, the polymer sheet 2 adheres on a flat counter surface. As an example of such polymer sheet, Serobi 555 manufactured by Taisei Laminator Co. Ltd. is listed. The polymer sheet is composed of low foamed foam with foaming ratio of about 1.5-fold with a thickness of 0.5 mm, in a size of 50 mm square, and peel strength is about 0.15 kg to glass.

The thickness of polymer sheet 2 is not particularly limited, The thicker, the better is adhesion strength. In this embodiment, for example, a thickness of about 500 μM to 800 μm is used.

Material for resin film 3 is not particularly limited, for example, there can be used a polyester film, polyamide film, polyethylene terephthalate film and nylon film. The resin film 3 is necessary for wiping sheet 4 to have durability (strength). The thicker the thickness of resin film 3, the strength is increased, but flexibility of wiping sheet 4 becomes poor. When the resin film 3 is too thick, it lacks flexibility and adhesiveness becomes poor, which makes a laminated sheet 4 to be peeled off easily in the case where the thickness of polymer sheet 2 is not sufficient.

In the present embodiment, the thickness of resin film 3 was 20 μm or less, for example, polyethylene terephthalate film with a thickness of 8 μm or 15 μm has been used so that it is flexible and can be attached on a somewhat concavo-convex surface resulting in good adhesiveness while keeping a necessary strength. In this way, the thickness of polymer 2 can be thickened to thereby increase adhesion strength in a given total thickness by relatively thinning the resin film 3. Also, by the increase in thickness of polymer sheet 2, the strength of wiping sheet 4 can be compensated when the thickness of resin film 3 is decreased.

FIG. 2 and FIG. 3 show how to use the wiping sheet 4 of the present invention.

For example, in the case of use in cellular phone 5, the sheet 4 is maintained in adsorption by pressing the polymer sheet side of wiping sheet 4 onto a housing of cellular phone 5 ordinarily as shown in FIG. 2, and peeled off from the housing on the occasion of wiping off dirt on screen 6, then screen 6 is wiped by pressing the side of microfiber cloth 1 thereon as shown in FIG. 3. In this way, whenever dirt is found on screen 6, it can be wiped readily for the screen 6 to be clean and good viewable.

As described above, an instance of cellular phone 6 has been described, wiping sheet 4 can be used in the same manner as in the screens such as television, car navigation, personal computer, electronic calculator, and lenses, further can be used for wiping off dirt on mirror face of CD by attaching it on a CD recorder and reproducing unit.

According to the wiping sheet of the present invention described above, sheet 4 is usually attached on a place of apparatus free from hindrance, when dirt adheres, it can be wiped off right after peeling off the sheet 4, unpleasant defogging and dirt can be quickly handled with good usability. Also, durability and flexibility of sheet 4, repeatedly attachable function of polymer sheet 2 side are all sufficient, and the sheet can be easily washed when it becomes dirty, thus can be used for a long period of time, which is economical. Further, company name, product name, advertisement and the like can be printed by a sublimatic printer on the microfiber cloth 1 side which is ordinarily the front face, thus, usage as a medium for advertisement and circulation can be also thought.

INDUSTRIAL APPLICABILITY

The wiping sheet of the present invention can be conveniently used in widespread use like cellular phone and personal computer, expecting wide needs, further, it can be used as advertising media for advertisement and circulation, which gives potential use not only in mere cellular phones and IT industries but also in wide fields of industries.

BRIEF DESCRIPTION OF THE DRAWINGS

FIG. 3 is an explanatory drawing showing wiping the screen of cellular phone using the wiping cloth of the present invention.

DESCRIPTION OF NUMBER AND SYMBOL

Figure 1:
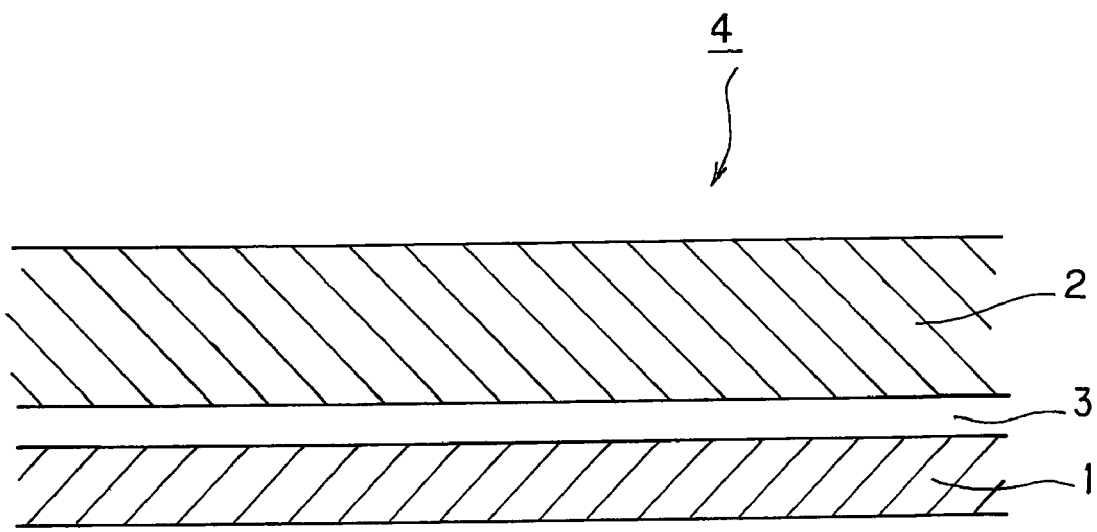
FIG. 1 is a schematic cross section of the wiping cloth of the present invention.
Figure 2:
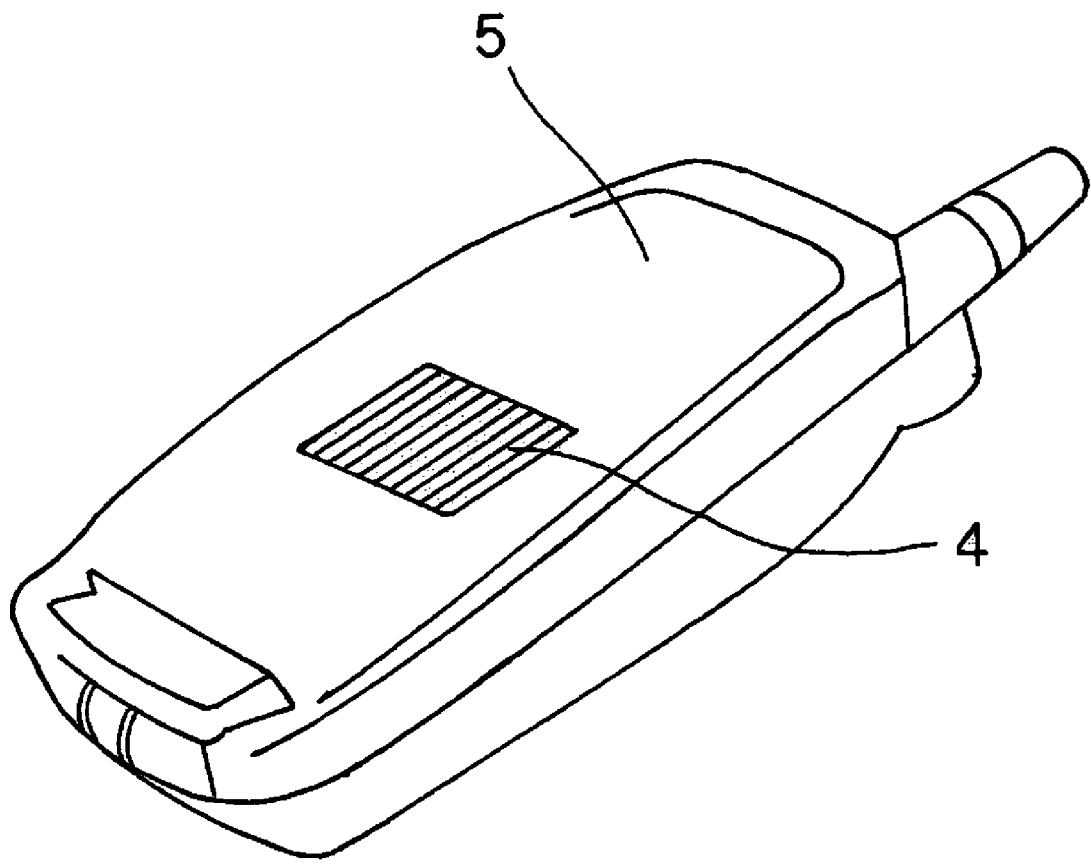
FIG. 2 is an explanatory drawing showing an adhesion maintaining state of the wiping cloth of the present invention on a cellular phone.

1 Microfiber cloth for wiping
2 Polymer sheet
3 Resin film
4 Wiping sheet
5 Cellular phone
6 Screen

What is claimed is:

1. A wiping sheet comprising:
   a resin film of 10 μm or less in thickness, wherein the resin film is made of a material selected from the group consisting of polyester, polyamide, polyethylene terephthalate and nylon;
   a microfiber cloth having a dirt wiping effect laminated on one side of said resin film; and
   a polymer sheet laminated on another side of said resin film, said polymer sheet comprising fine bubbles on a surface to provide a suction effect, the bubble distribution contributing to an adhesive property of the polymer sheet,
   wherein said microfiber cloth is composed of fibers in which each fiber is between 0.001 and 0.5 deniers per filament and said microfiber cloth has a thickness of between 50 and 500 μm, and
   wherein said polymer sheet has a thickness of between 500 and 800 μm and a peel strength 0.15 kg to glass.

2. The wiping sheet of claim 1, wherein said polymer sheet is an acryl based polymer sheet.

3. The wiping sheet of claim 1, wherein said microfiber cloth is a non-woven cloth.

4. The wiping sheet of claim 2, wherein said microfiber cloth is a non-woven cloth.

* * * * *